Dec. 16, 1969  JUNJIRO NISHI  3,484,853
ROTARY JOINT UNION FOR HEAVY DUTY
Filed May 13, 1968
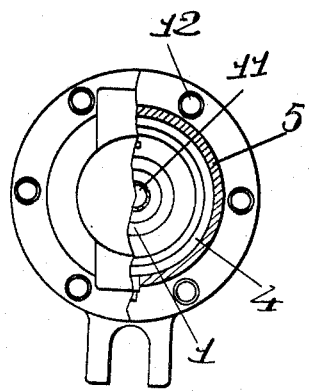
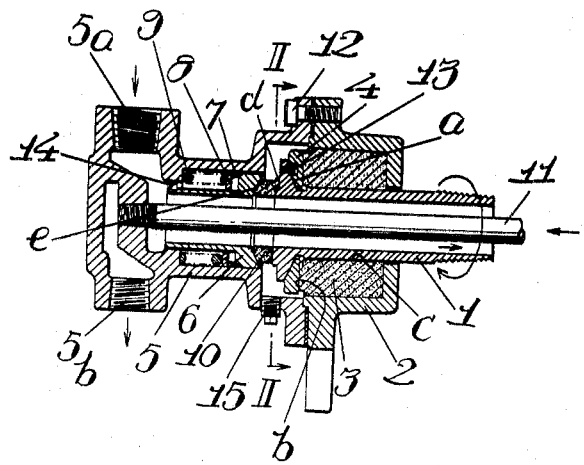
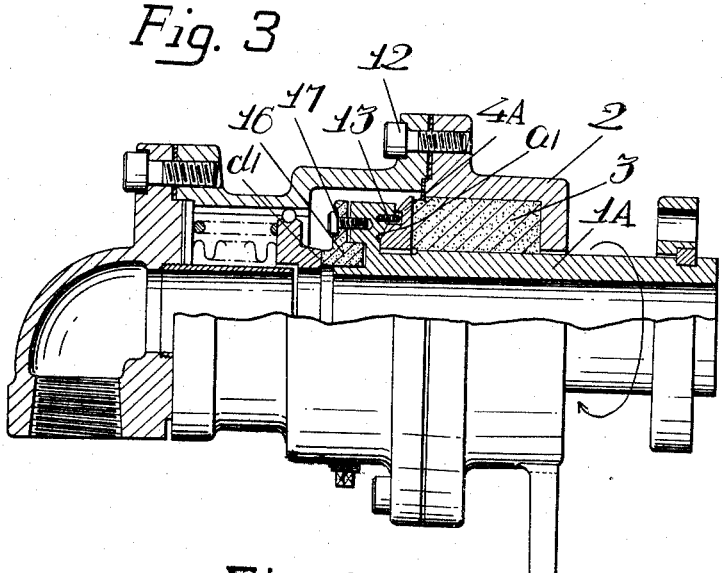
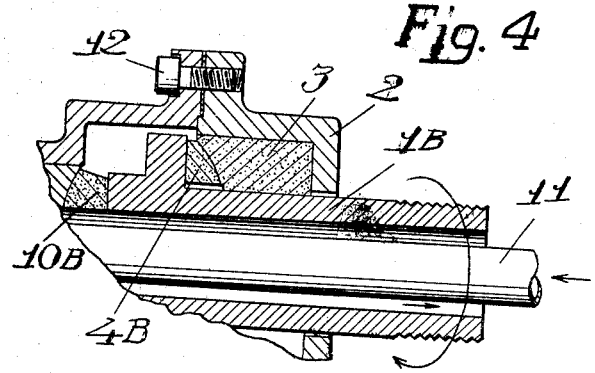
INVENTOR.
JUNJIRO NISHI
BY
Woodhams, Blanchard & Flynn
ATTORNEYS United States Patent Office 3,484,853
Patented Dec. 16, 1969

3,484,853
ROTARY JOINT UNION FOR HEAVY DUTY
Junjiro Nishi, Tokyo, Japan, assignor to Kabushiki Kaisha Takeda Seisakusho, Tokyo, Japan
Filed May 13, 1968, Ser. No. 728,697
Int. Cl. F16l 55/00, 35/00
U.S. Cl. 285—93
2 Claims

ABSTRACT OF THE DISCLOSURE

A rotary joint union for heavy duty feeding a fluid supplied under pressure from a stationary casing to a revolving rotor, the casing and rotor are communicated fluid-tightly with each other through a first annular sealing member interposed between them. The rotor is maintained in fluid-light relationship to a bearing member through a second sealing member interposed between a flange on the rotor and an end surface of the bearing member supporting the rotor. The second sealing member serves to prevent the fluid from leaking between the casing and bearing member, in the event that fluid-tightness between the casing and rotor fail.

---

The first sealing member, owing to the existence of the second sealing member backing it up, is reduced in its contacting surface in comparison with that of a single sealing member conventionally used in a rotary joint, and therefore torque transmitted to the contacting surface of said sealing member is reduced.

The present invention relates to a rotary joint union for heavy duty.

The present invention is to provide a system or construction in which, in a rotary joint union for heavy duty coupling a stationary pipe line with a revolving machine member for feeding a fluid from the former to the latter, leakage of the fluid which has been encountered around the rotary joint union can be completely prevented by first and second sealing members provided in said rotary joint union.

A rotary joint union is known wherein a single annular sealing member is inserted between the stationary portion of the rotary joint member and the rotor, so that leakage of fluid at the connecting surfaces of both members can be prevented.

The heavy duty rotary joint union of the present invention is so constructed that a further annular sealing member having a spherical face is inserted between a flange portion formed at one end of a rotor and being subject to thrust and a nonrefueling or self-lubricating bearing material, in order to provide sliding surfaces serving as effective sealing of frictioned portion of the nonrefueling or self-lubricating bearing.

In the accompanying drawings showing preferred embodiments of a rotary joint union for heavy duty, relating to the present invention, wherein, FIG. 1 shows a cross-sectional view of a rotary joint union for heavy duty;

FIG. 2 shows a view taken along the line II—II of FIG. 1 and partly cut down;

FIG. 3 shows a partly cross-sectioned view of another embodiment having a different construction of the same; and FIG. 4 shows a partial view showing a further embodiment of the same.

In describing embodiments of the heavy duty rotary joint union of the present invention with reference to the accompanying drawings; in which a rotor 1 has, at the left-portion in FIG. 1, a spherical convex face *a* having a center on the axis of said rotor. Said rotor 1 is supported rotatably by a bearing box 2, at the inside of which a low-friction graphite bearing 3 having a flat surface *b* at the left end thereof is rigidly fixed. Between said spherical convex face *a* of the rotor 1 and flat surface *b* of the bearing 3, a cast-iron annular or ring member 4 is inserted.

A casing 5 includes a sleeve with a flange 6 reciprocably slidable and pressed towards the rotor 1 by means of wedges 7 of Teflon and the like pushed by seal springs 9 through seal washers 8, and a graphite annular idle member 10 inserted between the flange portion of sleeve 6 and the rotor 1 and having at one side a spherical concave face *e* having a center on the axis of rotor 1 and at other side a flat sliding surface *d* extending perpendicularly to said axis, each of which forms a sealing and sliding surface in close contact with each of corresponding surfaces of the rotor 1 and the flange portion of sleeve 6.

The low-friction graphite bearing 3 is subject to normal load and moment on a sliding surface *c* contacting with the outer periphery of rotor 1, and thrust on the left end flat surface *b* thereof.

Due to uneven friction which may occur on the sliding surface *c*, the casing 5 and bearing box 2 are liable to be declined or deflected from the axis of rotor 1. In this case, the cast-iron annular member 4 and the graphite annular member 10 move vertically to contact and slide said spherical convex face *a*, left side flat surface *b*, spherical concave face *e* and flat surface *d* with and along corresponding surfaces, so that leakage of fluid to be caused due to said wear or friction may be completely prevented. In other words, leakage of fluid which will occur between sealing members deflected or declined from the axis of rotor 1 due to wear of low-friction graphite bearing 3, can be assuredly prevented by flat surfaces of said cast-iron annular member 4 and graphite annular member 10, and leakage of the fluid due to eccentricity of the rotor 1 can be assuredly prevented by spherical concave and convex faces of said both members.

If leakage of fluid should occur around any of contacting areas of spherical concave face *e* and the flat surface *d* of the graphite annular member 10, because of existence of dust and the like, further leakage of fluid which will pass through a gap between the low-friction graphite bearing 3 and the rotor can be effectively prevented by the spherical convex face *a* and the flat surface contacting with the flat surface *b* of the cast-iron annular member 4.

The casing 5 is provided at an upper left end with an opening 5*a* to which a flexible pipe having resistance to quake and a slight fluctuation in position will be connected for supplying a fluid, and at an under left end with another opening 5*b* to which a flexible drain pipe will be connected for discharging drainage. Steam supplied into the casing from the flexible pipe connected to said opening 5*a* passes through the bores of sleeve 6, graphite annular member 10 and rotor 1, all arranged in alignment, to a revolving machine member such as a steam drier drum (not shown) connected to the right side of the rotor 1, in FIG. 1. Steam fed into the drum, after heating the drum, is flowed back as drainage through a stationary inside pipe 11 and discharged or drained through the flexible pipe connected to the under opening 5b.

Inside the bearing box 2 fastened tightly to the right side of casing 5 bolts 12 through gaskets, the low-friction graphite bearing 3 is fitted rigidly, so that the supplied steam may not leak from the fitting or contacting surfaces of the low-friction graphite bearing with the bearing box. The low-friction graphite bearing 3 has a sliding surface c contacting with an outer peripheral surface of rotor 1 formed of quenched steel and finished precisely, and the left-side flat surface b finished precisely with lapping and sliding in contact with the right-side lapped surface of cast-iron annular member 4. Said flat surface b serves as a second sealing surface.

The cast-iron annular member 4 has at one side the spherical convex face a fitted to a spherical convex face formed at the flange portion of rotor 1, and at opposite side the flat surface sliding along the flat surface b of the low-friction graphite bearing 3. Said cast-iron annular member 4 is secured by pins 13 to the flange portion of rotor 1, in a manner of moving vertically but not revolving with the rotor 1 in rotation, and in a way that each of spherical concave face a and the right-side flat surface b is in close and precise contact with corresponding surfaces of rotor 1 and bearing 3. Thus, the cast-iron annular member 4 can perform an effective prevention of leakage of fluid. In case friction occurs on the sliding surface c of the low-friction graphite bearing 3 to cause a gap or chink between the outer periphery of rotor 1 and said sliding surface c, the cast-iron annular member 4 moves upwardly by the extent equal to the formed gap in relation to the low-friction graphite bearing 3. And, in case the sliding surface c is frictioned to form an inclined surface, said cast-iron annular member 4 moves towards the rotor 1 and bearing 3 with keeping the spherical concave face and the right-side flat surface thereof in precise and close contact with respective corresponding surfaces of the rotor 1 and the low-friction graphite bearing 3. This is the bearing system and forms the second sealing surfaces.

The sleeve 6 housed in the casing 5 is fastened by pins 14 to said casing in a manner of being permitted to move in the axial direction, but not to revolve with the rotor 1 in rotation. The sleeve 6 has at the right end a flange having a lapping finished spherical concave face, and is pressed its flange to the spherical convex face e of the graphite annular member 10 by means of wedges 7 pushed by seal springs 9 through seal washers, thereby ensuring sealing between the two spherical concave and convex faces.

The graphite annular member 10 has at the right end a lapping finished flat surface d slidingly movable along the left end flat surface of rotor 1, and at its left side the spherical convex face e closely contacting with the spherical convex face of the flange of the sleeve 6. Said graphite annular member 10 is idly movable with the spherical convex face e and surface d, and the latter surface d serves as a main sliding surface in respect of frictional resistance. When the graphite annular member 10 moves vertically in relative position of rotor 1, the flat surface d functions to seal. Meanwhile, if there takes place the axial deflection, both flat surface d and spherical convex face e slide for adjustment. It is notable that the graphite annular member 10 is firmly maintained in position with steam pressure as well as the seal springs 9 applying force rightwardly in the axial direction. Thus, the first sealing surface is effectively ensured.

Minimization of contacting surface or area in the first sealing member results in reduction of torque to be given to the joint.

An opening 15 is provided at the under right side of the casing 5 for inspecting leakage of fluid at the first sealing area, whenever it is necessary. The opening 15 may be blocked with a plug or cork.

If the leakage of fluid should be inspected at the first sealing area through said opening 15, the second seal member can compensate the sealing function.

With increase of leakage at the first sealing area, steam pressure to be applied to the casing 5 increases. This enforces the sealing pressure to the second sealing surface or area to enhance the sealing effect of the second sealing member.

The above description shows only an example where the heavy duty rotary joint union is applied to a steam drier drum. The embodiment of heavy duty rotary joint union of the present invention is not limited to the above example, but favorably employed in an equipment supplying fluid from a stationary pipe line to a revolving machine member, since this rotary joint has the least probability of leakage, is subject to lower torque and most suitable for a long period of running without oil feeding.

FIG. 3 shows another embodiment of the rotary joint union for heavy duty, in which a cast-iron annular member 4A has at the left end a spherical convex face a1, instead of the spherical concave face a in FIG. 1; and a graphite bearing 16, instead of the graphite idle annular member 10, is fastened by a bolt 17 to a left end of rotor 1A and has a single sliding surface d1. And, if any declination occurs due to friction, bellows provided adjacent to said graphite bearing 16 compensates or assists to function of the single sliding surface. This embodiment is preferably employable in an equipment operated under high temperature and high pressure.

Materials of sliding members is not limited to cast-iron or graphite, but depend upon fluid to be applied.

In an embodiment shown in FIG. 4, there is shown a graphite seal 4B having at one end a spherical convex face corresponding to a spherical concave face formed at an opening end of the low-friction graphite bearing, and at the other end a flat surface engaging a flat surface on the flange of the rotor 1B. A graphite annular member 10B engages the end surface of the rotor.

What is claimed is:

1. A rotary joint union, comprising:
   a cylindrical casing having a fluid receiving opening at one end and a fluid discharge opening at the other end;
   a bearing box in said casing communicating with and encircling said fluid discharge opening;
   a rotor located in and extending coaxially with said fluid discharge opening through said bearing box, said rotor having an integral flange projecting radially outwardly therefrom, said flange comprising one of a flat and a spherical surface;
   self-lubricating means disposed in said bearing box and encircling said rotor to rotatably support same, said self-lubricating means filling the space of said bearing box and sealingly engaging the outer peripheral wall of said rotor, said self-lubricating means having a sealing face at one end thereof, said sealing face comprising the other of the flat and the spherical surface;
   a sleeve axially slideably located in said fluid discharge opening and having an inside diameter substantially equal to said rotor, sealing means between the ends of said rotor and said sleeve and means resiliently urging said sleeve toward said rotor to compress said sealing means therebetween;
   a seal positioned between and engaging said flange and said sealing face of said self-lubricating means, said seal having a radially elongated slot therein, a pin secured to said flange at one end and received at the other end in said radially elongated slot, said seal having a spherical surface at one end and a flat surface at the other end to accommodate a sealing engagement with said flange and said sealing face.

2. The rotary joint union defined in claim 1, including an opening in said casing providing communication between said fluid discharge opening and the exterior of said casing, said opening being plugged with a removable plug.

References Cited

UNITED STATES PATENTS

| | | | |
|---|---|---|---|
| 1,934,717 | 11/1933 | Johnson | 285—263 X |
| 2,153,825 | 4/1939 | Difazio | 285—134 X |
| 2,791,449 | 5/1957 | Monroe | 285—134 |
| 2,805,086 | 9/1957 | Shumaker | 285—134 |
| 2,805,087 | 9/1957 | Shaw et al. | 285—134 |
| 2,836,439 | 5/1958 | Moore | 285—134 X |
| 2,873,538 | 2/1959 | Shumaker | 285—134 X |
| 2,964,340 | 12/1960 | Kinzie et al. | 285—134 |
| 3,029,094 | 4/1962 | Parlasca et al. | 285—93 X |

THOMAS F. CALLAGHAN, Primary Examiner

U.S. Cl. X.R.

285—134, 279